(12) United States Patent
Jee et al.

(10) Patent No.: US 7,774,916 B2
(45) Date of Patent: Aug. 17, 2010

(54) SHRINK FITTING METHOD INCLUDING DEFORMATION

(75) Inventors: Kwang-Koo Jee, Seoul (KR); Jun-Hyun Han, Seoul (KR); Yoon-Bae Kim, Seoul (KR)

(73) Assignee: Korea Institute of Science and Technology (KR)

( * ) Notice: Subject to any disclaimer, the term of this patent is extended or adjusted under 35 U.S.C. 154(b) by 959 days.

(21) Appl. No.: 11/555,525

(22) Filed: Nov. 1, 2006

(65) Prior Publication Data

US 2007/0107188 A1    May 17, 2007

(30) Foreign Application Priority Data

Nov. 2, 2005    (KR) .................... 10-2005-0104589

(51) Int. Cl.
*B23P 11/00* (2006.01)
*B23P 11/02* (2006.01)
*F16B 4/00* (2006.01)

(52) U.S. Cl. .............................. 29/447; 29/508; 29/515; 29/516; 29/517; 403/273; 403/282; 403/285; 285/382.1; 285/381.1

(58) Field of Classification Search .................. 29/447, 29/508, 515, 516, 517; 403/273, 282, 285; 285/381.1, 382.1, 382
See application file for complete search history.

(56) References Cited

U.S. PATENT DOCUMENTS

| | | | | | |
|---|---|---|---|---|---|
| 2,224,145 | A | * | 12/1940 | Dugan et al. ................. | 228/189 |
| 2,739,829 | A | * | 3/1956 | Cundiff et al. .............. | 285/21.2 |
| 3,494,642 | A | * | 2/1970 | Brown et al. ................. | 285/329 |
| 3,513,429 | A | * | 5/1970 | Helsop ......................... | 337/382 |
| 3,579,805 | A | * | 5/1971 | Kast ............................. | 148/529 |
| 4,198,081 | A | * | 4/1980 | Harrison et al. ........... | 285/381.2 |
| 4,332,073 | A | * | 6/1982 | Yoshida et al. ............. | 29/421.1 |
| 4,377,894 | A | * | 3/1983 | Yoshida ...................... | 29/421.1 |
| 4,449,281 | A | * | 5/1984 | Yoshida et al. ............. | 29/421.1 |
| 4,598,857 | A | * | 7/1986 | Matsui ........................ | 228/132 |
| 6,637,110 | B2 | * | 10/2003 | Jee ........................ | 29/890.031 |

* cited by examiner

*Primary Examiner*—Jermie E Cozart
(74) *Attorney, Agent, or Firm*—Ostrolenk Faber LLP

(57) ABSTRACT

A new shrink fitting method including deformation is disclosed, in which a high bonding force can be obtained without accurate mechanical process such as forming an insertion body having an outer diameter greater than an inner diameter of an object for receiving the insertion body. The shrink fitting method comprises preparing a pipe and a rod material whose inner and outer diameters are different from each other; bonding the pipe and the rod material to each other in a state that the pipe or the rod material is deformed by heating; deforming the pipe to allow the inner diameter of the pipe to be equal to the outer diameter of the rod material; and cooling the bonded pipe and rod material. The shrink fitting method can be widely used for various mechanical parts.

6 Claims, 11 Drawing Sheets

SHRINK FITTING METHOD INCLUDING DEFORMATION

RELATED APPLICATION

The present disclosure relates to subject matter contained in priority Korean Application No. 10-2005-0104589, filed on Nov. 02, 2005, which is herein expressly incorporated by reference in its entirety.

BACKGROUND OF THE INVENTION

1. Field of the Invention

The present invention relates to a shrink fitting method, and more particularly, to a new shrink fitting method including deformation, in which a high bonding force can be obtained without accurate mechanical process such as forming an insertion body having an outer diameter greater than an inner diameter of an object for receiving the insertion body.

2. Description of the Background Art

Shrink fitting is metal bonding technique using expansion and shrinkage of metal due to heat, and is widely used for mechanical parts owing to advantages of mechanical bonding with no welding defect and simple process.

The principle of shrink fitting will be described as follows. For example, supposing that a metallic rod material is bonded into a pipe, the pipe is prepared to have an inner diameter smaller than a diameter of the metallic rod material. If the pipe is heated, its inner diameter increases due to thermal expansion, so that the rod material can be inserted into the pipe. Then, if the pipe is cooled at a normal temperature, the inner diameter of the pipe should be smaller than the diameter of the rod material. In this case, a strong bonding force occurs between the pipe and the rod material. Thus, the rod material is strongly fitted into the pipe even though the inner diameter of the pipe is smaller than the diameter of the rod material.

The principle of shrink fitting is very simple but has difficulty in practical use due to accuracy. How the inner diameter of the pipe should be smaller than the rod material and its relevant problem will be described with reference to FIG. 1. FIG. 1 illustrates a bonding force based on a difference between the inner diameter (ID) of the heated pipe and the diameter (OD) of the rod material. Three fields can be formed by the difference. If the difference is greater than an increment of the inner diameter due to thermal expansion, there is no bonding force. This is because that the pipe is just shrunk (field I). In this case, the pipe is prepared to have an inner diameter greater than the diameter of the rod material at a normal temperature.

In the second field, the bonding force increases if the diameter difference increases. This is because that restricted thermal expansion (i.e., not returned to original state even in case of cooling) increases (field II). If there is no diameter difference, the bonding force reaches a maximum value. In this case, the rod material is tightly fitted into the heated pipe.

If the OD is greater than the ID as shown in the field 111, there is no bonding as the rod material is not inserted into the pipe.

Generally, it is known that an industrial pipe or rod material has a diameter tolerance in the range of 2% because it is not a genuine circle. Since the change of the diameter is in the range of 0.5% (0.45% if heated at 300° C. because thermal expansion coefficient of metal is generally $15 \times 10^{-6}/°$ C.) due to thermal expansion, shrink fitting is not suitable for the industrial pipe or rod material.

Thus, shrink fitting cannot be widely used for general industrial parts because it is available only when accurate mechanical process follows.

SUMMARY OF THE INVENTION

Therefore, an object of the present invention is to provide a new shrink fitting method that does not require an accurate process.

Another object of the present invention is to provide a shrink fitting method widely used for industrial parts without accurate process.

To achieve these and other advantages in accordance with the purpose of the present invention, as embodied and broadly described herein, it is provided that a shrink fitting method comprising preparing a pipe and a rod material whose inner and outer diameters are different from each other; bonding the pipe and the rod material to each other in a state that the pipe or the rod material is deformed by heating; deforming the pipe for the inner diameter of the pipe to become equal to the outer diameter of the rod material; and cooling the bonded pipe and rod material.

In another aspect of the present invention, it is provided that a shrink fitting method comprising preparing two pipes and a coupling having a diameter different from those of the two pipes; heating the coupling or the pipes; bonding the coupling between the two pipes; deforming the pipes or the coupling for outer and inner diameters between the coupling and the pipes to become equal to each others; and cooling the bonded pipes and coupling.

According to the shrink fitting method of the present invention, the inner diameter of the pipe always equals to the outer diameter of the rod material to obtain a maximum bonding force even in case that a tolerance exists in the pipe or the rod material.

For the aforementioned, the diameter of the pipe is reduced by deformation after the rod material is inserted into the heated pipe. Although the inner diameter of the pipe is generally reduced by cooling, it is not reduced due to the rod material so that the pipe and the rod material can be bonded to each other by a strong bonding force. In this case, for desirable insertion, a tolerance range is set so that the inner diameter of the pipe is properly greater than the outer diameter of the rod material.

In the present invention, the inner diameter of the pipe always becomes equal to the outer diameter of the rod material to obtain a maximum bonding force. As a result, the shrink fitting method of the present invention can be used for various industrial fields.

The foregoing and other objects, features, aspects and advantages of the present invention will become more apparent from the following detailed description of the present invention in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and, together with the description, explain the principles of the invention.

In the drawings.

DETAILED DESCRIPTION OF THE INVENTION

Reference will now be made in detail to the preferred embodiments of the present invention, the examples are illustrated in the accompanying drawings.

While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit of the invention as defined by the appended claims.

FIGS. 2A to 2D and 3A to 3E respectively illustrate the related art shrink fitting and shrink fitting according to the present invention.

Figure 2A:
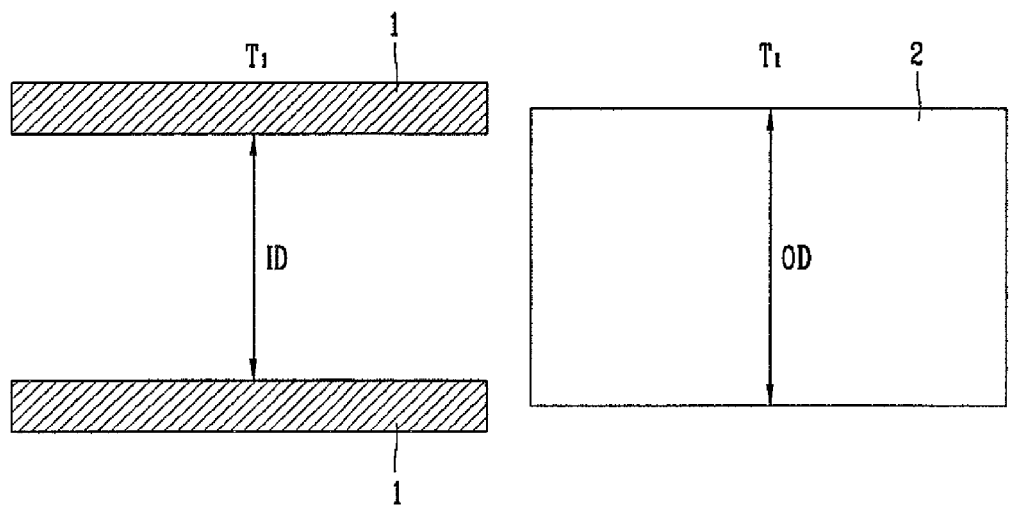
FIGS. 2A to 2D are process views illustrating the principle of related art shrink fitting.

Referring to FIG. 2A, a pipe 1 is prepared to have an inner diameter ID smaller than an outer diameter OD of a rod material 2 corresponding to an insertion body. In FIG. 2A, T1 denotes a normal temperature or a low temperature, and T2 denotes a heating temperature.

Figure 2B:
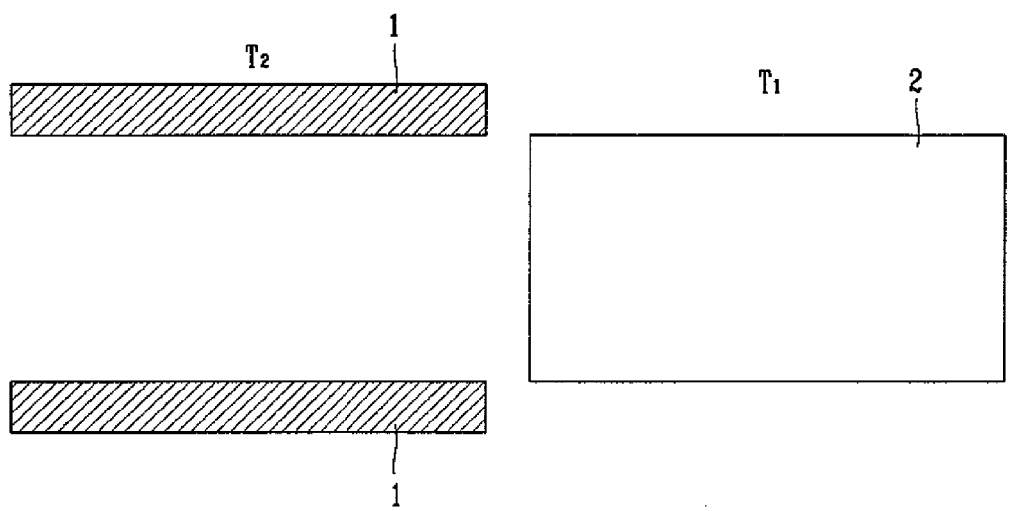
Figure 2C:
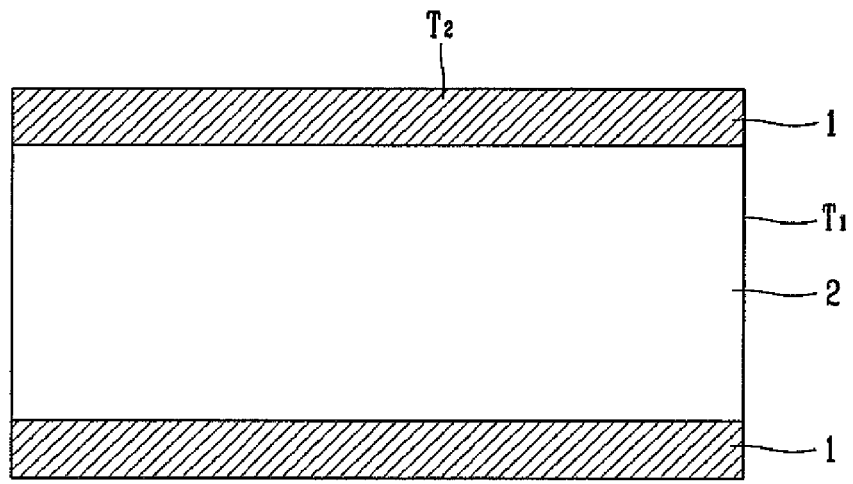

Referring to FIG. 2B, if the pipe 1 is heated to T2, the ID increases due to thermal expansion and the rod material 2 is inserted into the pipe 1. FIG. 2C illustrates the state that the rod material 2 has been inserted into the pipe 1.

Figure 2D:
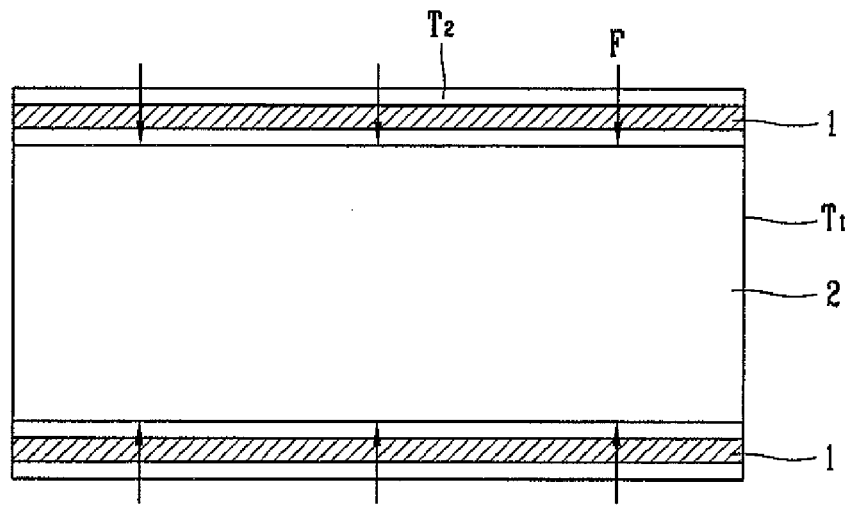

FIG. 2D illustrates the state after cooling, in which the pipe 1 is not returned to its original inner diameter state before thermal expansion due to the thickness of the rod material 2, whereby a bonding force F occurs between the pipe 1 and the rod material 2.

Figure 1:
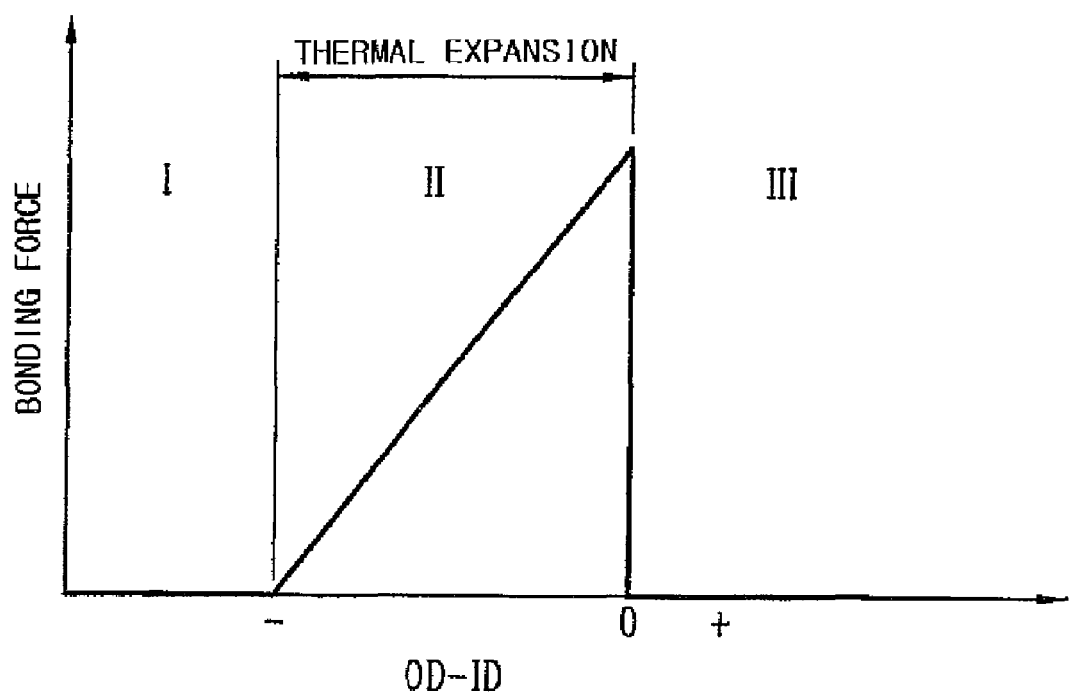
FIG. 1 is a graph illustrating variation of a bonding force based on a difference obtained by subtracting an inner diameter of a pipe from a diameter of a rod material.

At this time, the bonding force can be checked by obtaining the difference between the OD and the ID in FIG. 2B and substituting the difference for the graph of FIG. 1.

FIGS. 3A to 3E are process views illustrating the principle of shrink fitting according to the present invention. Referring to FIGS. 3A to 3E, the present invention is obviously different from the related art in the inner diameter of the original pipe.

In the related art shrink fitting, the ID of the pipe should be determined carefully considering the insertion and the bonding force. However, in the shrink fitting method of the present invention, since insertion is only considered, a tolerance can be set in a wide range.

Figure 3A:
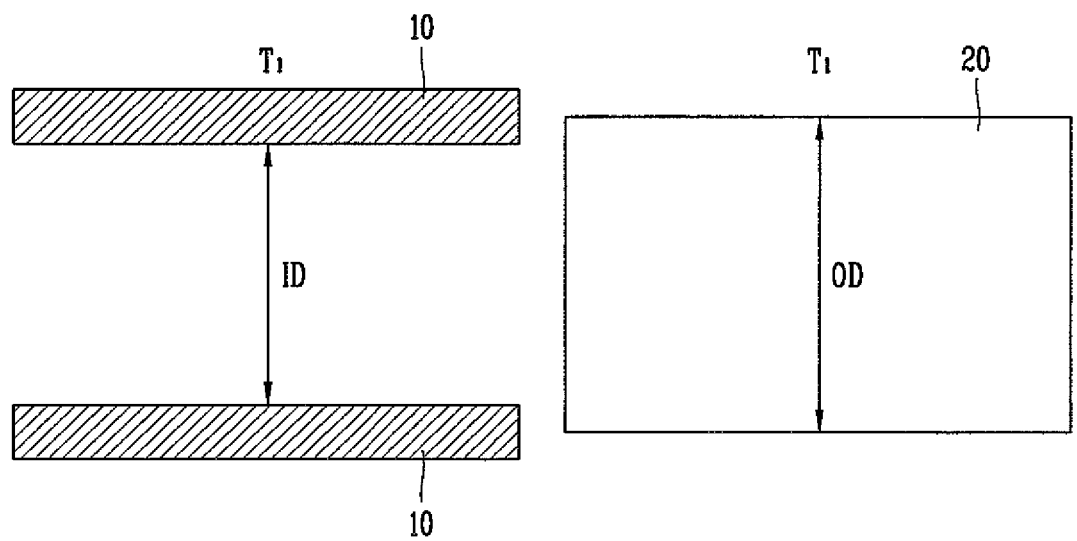
FIGS. 3A to 3E are process views illustrating the principle of shrink fitting according to the present invention.
Figure 3B:
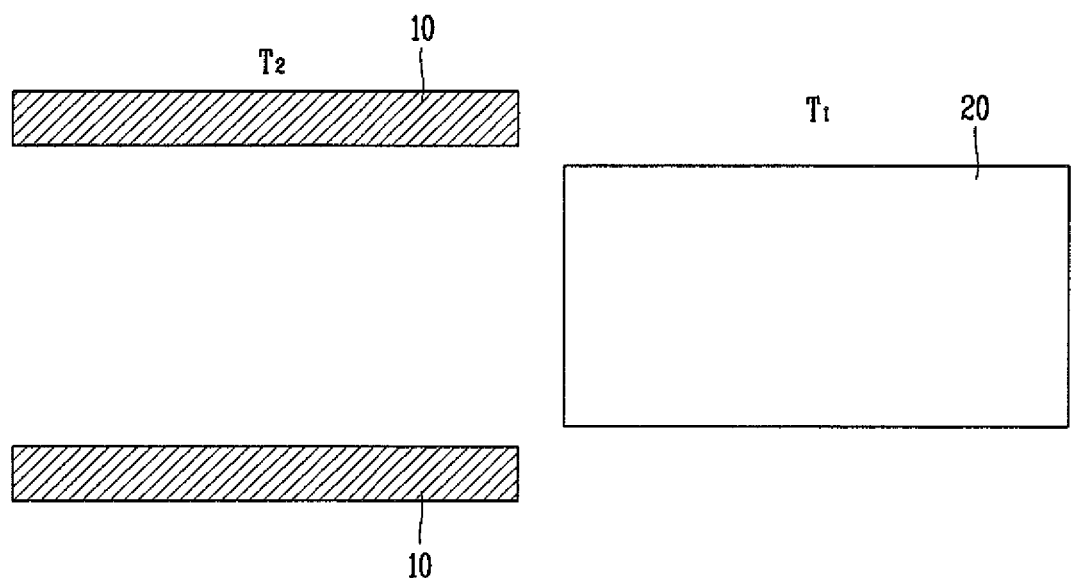
Figure 3C:
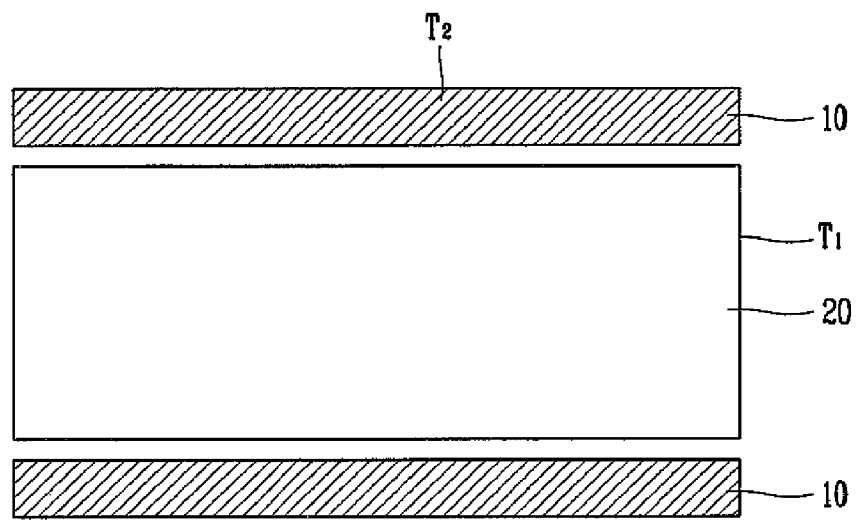

The process of enlarging the inner diameter depending on heating of the pipe 10 of FIG. 3B and the insertion process of FIG. 3C are similar to those of the related art.

Figure 3D:
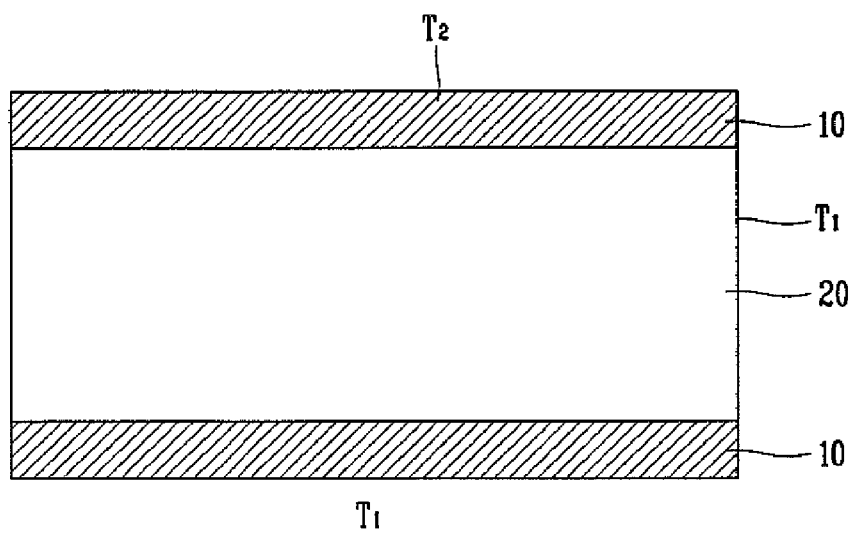

Afterwards, as shown in FIG. 3D, deformation can be made to the ID of the pipe 10 so that the ID of the pipe 10 becomes equal to the OD of the rod material 20. This process is not performed in the related art shrink fitting method.

Groove rolling or swaging may be used to reduce the diameter of the pipe or the rod material.

In the embodiment of the present invention, for deformation of the pipe, a pipe cutter has been made so that two rolls are fixed while one roll is movable.

After the rod or the pipe is inserted between the three rolls, if the pipe is rotated between the three rolls while a moving one of the rolls is tightened, the diameter of the pipe or the rod material can be reduced.

It is required that a gap should not appear between the pipe and the rod material when deformation of the pipe is made.

Figure 3E:
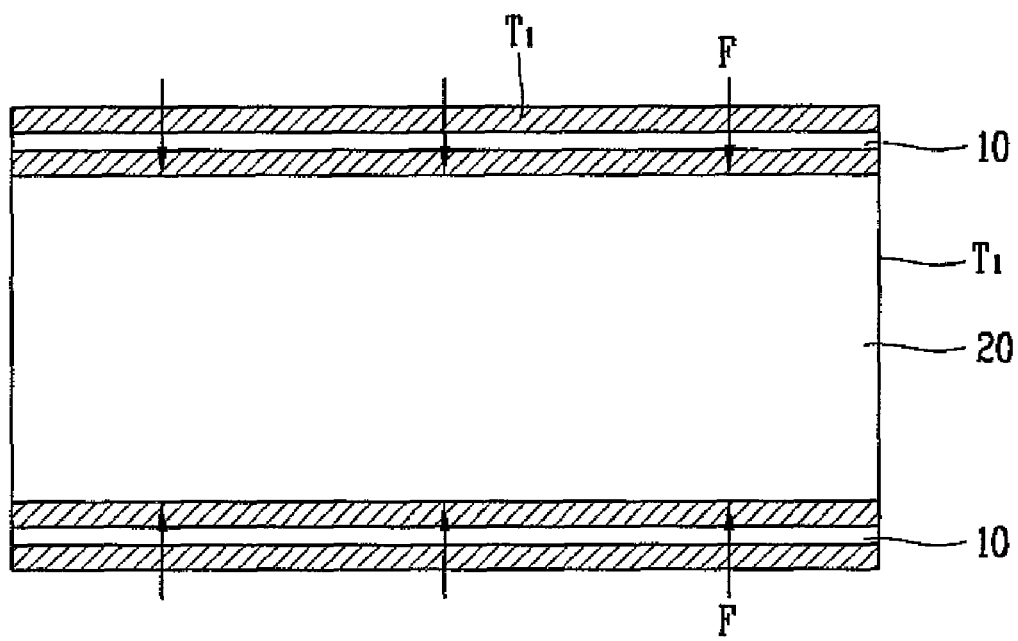

As shown in FIG. 3E, the pipe and the rod material are strongly bonded to each other by cooling at T1. In this case, a tolerance can be set in a wide range and the maximum bonding force F can be obtained.

The difference between the related art shrink fitting and the shrink fitting of the present invention will be described with reference to FIG. 1.

In the related art shrink fitting, accurate mechanical process is required so that the difference between the OD and the ID is a minus value (i.e., the inner diameter of the pipe 1 is smaller than the outer diameter of the rod material 2) and is close to zero if possible. By contrast, in the shrink fitting of the present invention, if the difference between the OD and the ID is minus and insertion is available, the ID is reduced so that the OD becomes equal to the ID, whereby the maximum bonding force can be obtained without accurate mechanical process.

The shrink fitting of the present invention allows strong bonding between the pipe and the rod material and also allows the following applications.

EXAMPLE 1

Pipe Bonding 1

If welding is used for bonding between pipes, it is likely that a defect occurs to cause breakdown, and process steps are complicated to cause expensive cost.

Also, since metals having high reactivity, such as titanium, require welding condition, technical difficulty exists. Accordingly, a mechanical bonding method that does not require welding can be widely used for bonding between pipes.

However, since most of mechanical coupling parts have complicated structures, are expensive, and have difficulty in sealing, it is difficult to use them at high pressure. Although a method of bonding pipes using a shape memory alloy is being developed, this method is not generally used because the cost of the alloy is expensive and sealing is not solved.

It is generally known that the industrial pipe has a diameter error in the range of 2% considering the genuine circle. Since the diameter of the industrial pipe is varied in the range of 0.5% due to thermal expansion, the related art shrink fitting cannot be used for the industrial pipe. For reference, since the shape memory alloy stores the diameter in the range of 8%, it can be used even in case of a tolerance of 2%.

In the present invention, two pipes can be bonded to each other using the aforementioned new shrink fitting method.

The outer pipe is processed before cooling so that a pipe shaped coupling (insertion body) is tightly welded into the pipe.

The pipe and the pipe shaped coupling can be bonded to each other using the shrink fitting method of the present invention.

FIGS. 4A to 4D are process views illustrating a bonding example of the pipes using the shrink fitting method according to one embodiment of the present invention.

Figure 4A:
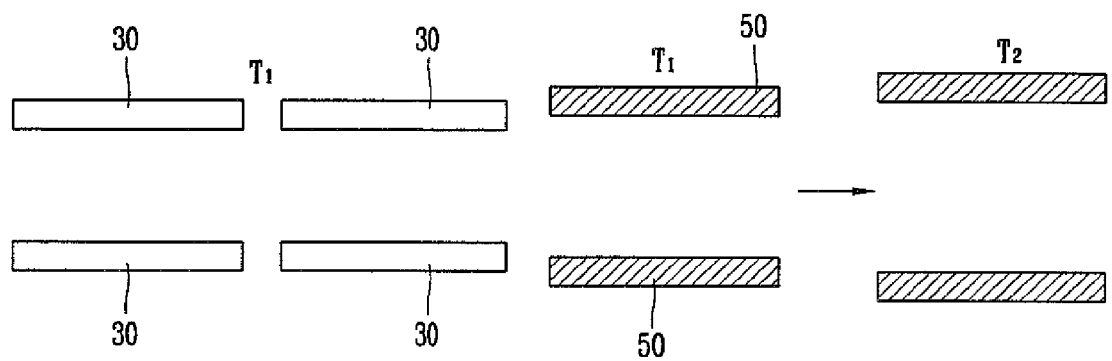
FIGS. 4A to 4D are process views illustrating a bonding example of a pipe using shrink fitting according to one embodiment of the present invention.

To insert the coupling 50 for bonding two pipes 30 to each other, the inner diameter of the coupling 50 heated at T2 should be greater than or equal to the outer diameter of the pipe 30 (see FIG. 4A).

Figure 4B:
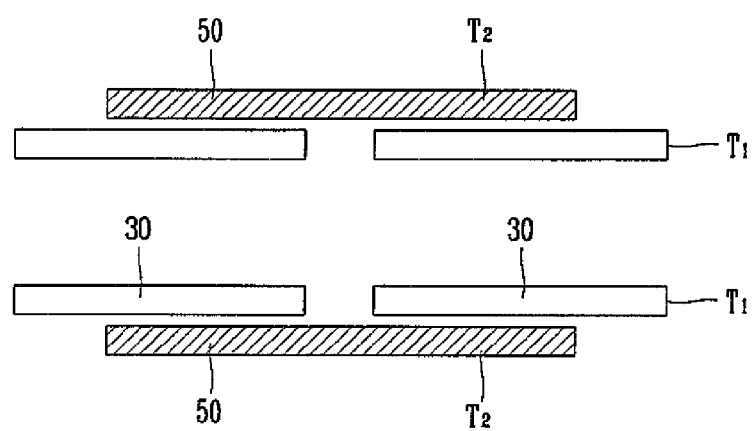

The pipe 30 is inserted into the coupling 50 heated at T2 (see FIG. 4B).

Figure 4C:
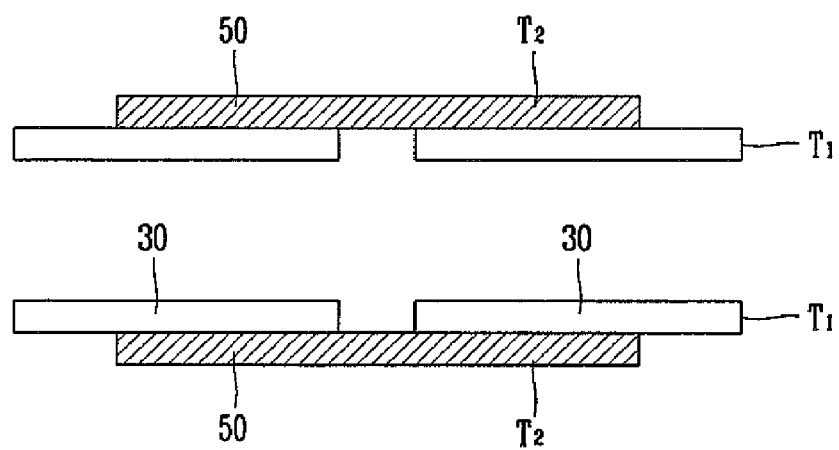
Figure 4D:
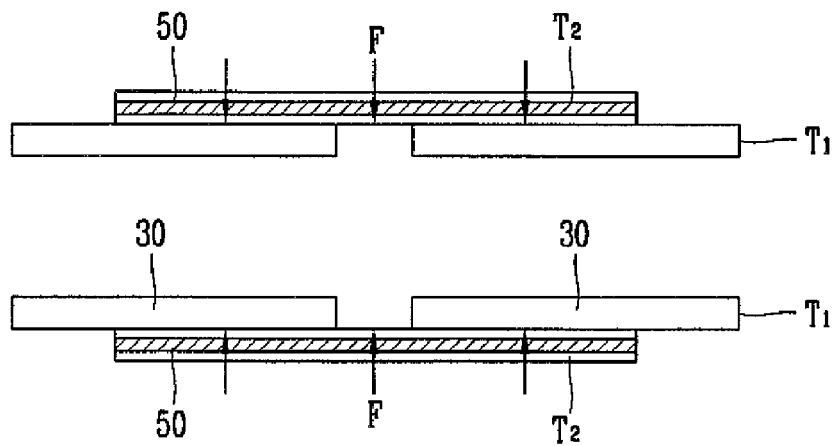

The diameter of the heated coupling 50 is reduced by deformation (see FIG. 4C). Even after the outer diameter of the pipe 30 equals to the inner diameter of the coupling 50, a gap may appear between the coupling 50 and the pipe 30 because the coupling 50 and the pipe 30 are not real circles. Accordingly, the diameter of coupling 50 is reduced so as not to generate such a gap.

As a result, sealing characteristics can be improved. If the coupling 50 is cooled at T1, it is not shrunk due to the pipe 30 and thus a strong bonding force F occurs. Such a strong bonding force occurs because the coupling 50 is strongly fitted into the pipe 30 as the inner diameter of the coupling 50 becomes smaller than the outer diameter of the pipe 30.

EXAMPLE 2

Pipe bonding 2

Pipe bonding can be used for the case where the coupling 50 is inserted into the pipe 30.

Figure 5A:
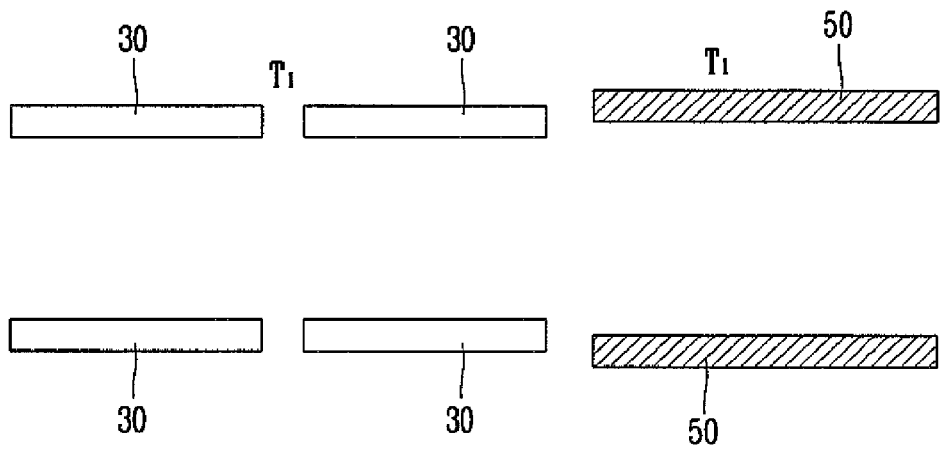
FIGS. 5A to 5E are process views illustrating a bonding example of a pipe using shrink fitting according to another embodiment of the present invention.
Figure 5B:
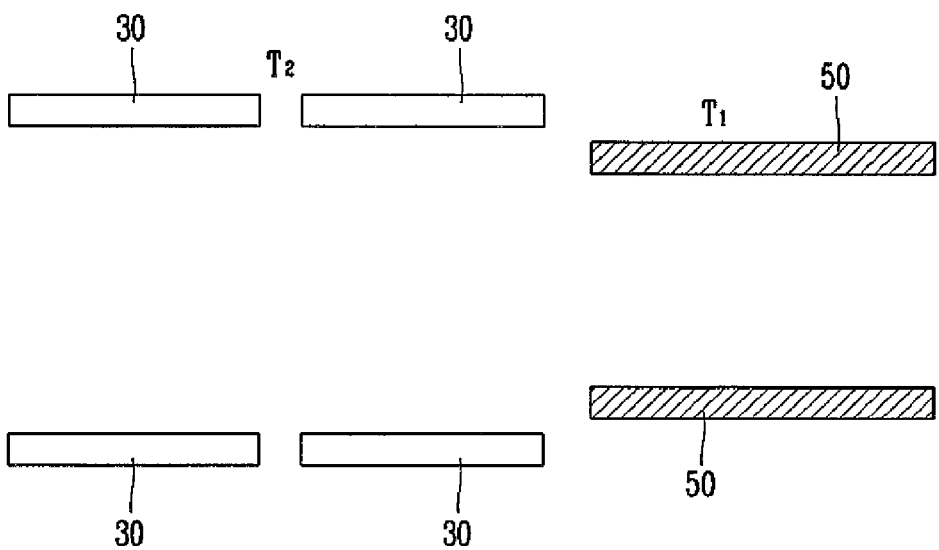
Figure 5C:
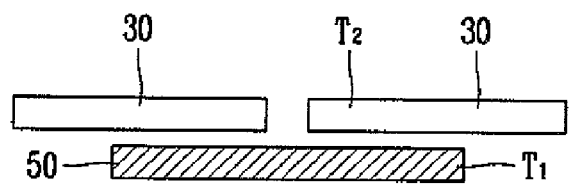
Figure 5C:
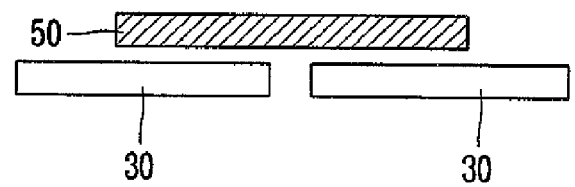
Figure 5D:
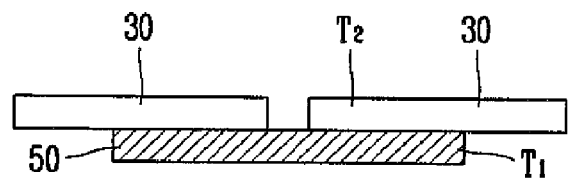
Figure 5D:
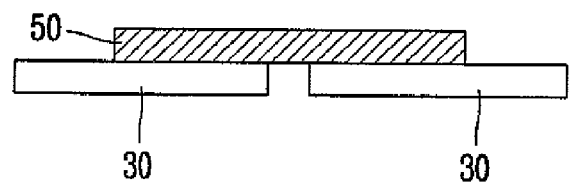

Referring to FIGS. 5A to 5E, the coupling 50 is prepared to have an outer diameter smaller than an inner diameter of the pipe 30 heated at T2 (FIG. 5A). Then, the end of the pipe 30 is heated (FIG. 5B) and the coupling 50 is inserted into the pipe 30 (FIG. 5C).

Figure 5E:
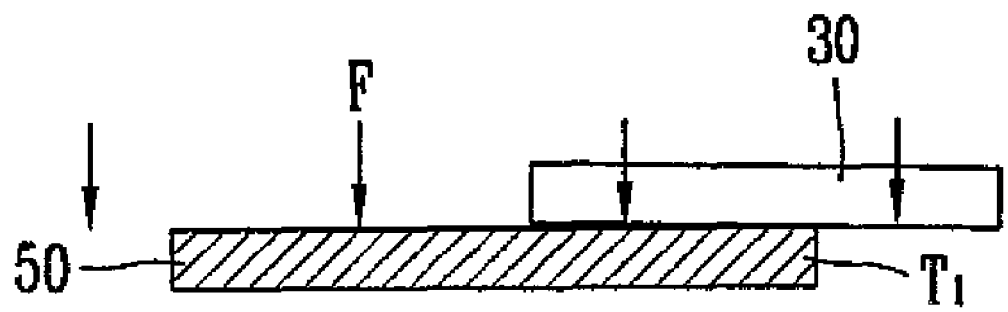
Figure 5E:
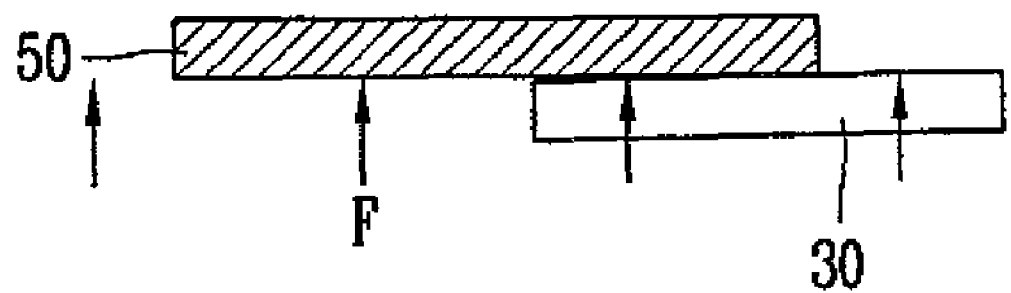

If the diameter of the pipe 30 is reduced so as not to generate a gap between the coupling 50 and the pipe 30 (FIG. 5D), the pipe 30 is cooled at T1 to generate a strong bonding force F with the coupling 50 (FIG. 5E).

It has been described that the coupling 50 is heated in the example 1 referring to FIGS. 4A to 4D while the end of the pipe 30 is heated in the example 2 referring to FIGS. 5A to 5E. To increase the difference in temperature between the pipe 30 and the coupling 50, it is more effective that the end of the pipe 30 should be cooled in the example 1 while the coupling 50 should be cooled in the example 2.

The shrink fitting method of the present invention, which does not require accurate mechanical process, can widely be used in the industrial field. Particularly, if the shrink fitting method is used for pipe bonding, the cost is less expensive than that of the existing coupling part and various metal materials can be used regardless of their kinds.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A shrink fitting method comprising:
   preparing a pipe and a rod material whose inner and outer diameters are different from each other;
   bonding the pipe and the rod material to each other in a state that the pipe or the rod material is deformed by heating;
   deforming the pipe to allow the inner diameter of the pipe to become equal to the outer diameter of the rod material by inserting the pipe between two fixed rolls and a movable roll and tightening the movable roll; and
   cooling the bonded pipe and rod material.

2. A shrink fitting method comprising:
   preparing a pipe and a rod material whose inner and outer diameters are different from each other;
   bonding the pipe and the rod material to each other in a state that the pipe or the rod material is deformed by heating;
   deforming the pipe to allow the inner diameter of the pipe to become equal to the outer diameter of the rod material; and
   cooling the bonded pipe and rod material,
   wherein the pipe is deformed by inserting the pipe between two fixed rolls and a movable roll and tightening the movable roll, and
   wherein the pipe is rotated between the three rolls to uniformly reduce its inner diameter.

3. A shrink fitting method comprising:
   preparing two pipes and a coupling having a diameter different from those of the two pipes;
   heating the coupling or the pipes;
   bonding the coupling between the two pipes;
   deforming the pipes or the coupling to allow outer and inner diameters between the coupling and the pipes to be equal to each other by inserting the pipe between two fixed rolls and a movable roll and tightening the movable roll; and
   cooling the bonded pipes and coupling.

4. The shrink fitting method as claimed in claim 3, wherein the inner diameter of the coupling is smaller than that of each pipe.

5. The shrink fitting method as claimed in claim 3, wherein the inner diameter of the coupling is greater than that of each pipe.

6. The shrink fitting method as claimed in claim 3, wherein the end of the pipe is cooled when the pipe or the coupling is cooled.

* * * * *